(12) United States Patent
Cao et al.

(10) Patent No.: US 11,904,653 B2
(45) Date of Patent: Feb. 20, 2024

(54) INTEGRATED RADIATOR ASSEMBLY

(71) Applicant: ZHEJIANG JIZHI NEW ENERGY AUTOMOBILE TECHNOLOGY CO., LTD, Zhejiang (CN)

(72) Inventors: Lanbao Cao, Hangzhou (CN); Zhonggang Liu, Hangzhou (CN); Xiujuan Xu, Hangzhou (CN); Lin Lei, Hangzhou (CN); Shitong Hu, Hangzhou (CN); Yanlin Liu, Hangzhou (CN)

(73) Assignee: ZHEJIANG JIZHI NEW ENERGY AUTOMOBILE TECHNOLOGY CO., LTD, Zhejiang (CN)

( * ) Notice: Subject to any disclaimer, the term of this patent is extended or adjusted under 35 U.S.C. 154(b) by 428 days.

(21) Appl. No.: 17/419,779

(22) PCT Filed: Dec. 30, 2019

(86) PCT No.: PCT/CN2019/130150
§ 371 (c)(1),
(2) Date: Jun. 30, 2021

(87) PCT Pub. No.: WO2020/140882
PCT Pub. Date: Jul. 9, 2020

(65) Prior Publication Data
US 2022/0080801 A1     Mar. 17, 2022

(30) Foreign Application Priority Data

Dec. 30, 2018 (CN) .......................... 201811649247.0

(51) Int. Cl.
*B60H 1/00* (2006.01)
(52) U.S. Cl.
CPC ..... *B60H 1/00342* (2013.01); *B60H 1/00328* (2013.01)

(58) Field of Classification Search
CPC .. B60H 1/00342; B60H 1/00328; B60H 1/08; B60H 1/008; B60H 1/00392;
(Continued)

(56) References Cited

U.S. PATENT DOCUMENTS 1,123,201 A * 12/1914 Almirall ............... F28D 1/0435
165/140
2,034,428 A * 3/1936 De Baufre ............ F28F 9/0239
165/140
(Continued)

FOREIGN PATENT DOCUMENTS

CN         1225714 A     8/1999
CN         1275709 A    12/2000
(Continued)

OTHER PUBLICATIONS

Supplementary European Search Report for EP Application No. 19906735.6 dated Jan. 24, 2022 (4 pages).
(Continued)

*Primary Examiner* — Justin M Jonaitis
(74) *Attorney, Agent, or Firm* — Westbridge IP LLC

(57) ABSTRACT

Provided is an integrated radiator assembly, and belongs to the field of vehicles. The integrated radiator assembly includes: multiple groups of refrigerant flat tubes, wherein multiple refrigerant flow channels are disposed in each group of the refrigerant flat tubes; a refrigerant collection tube, disposed at two ends of the multiple groups of refrigerant flat tubes and in communication with each of the refrigerant flow channels; multiple groups of cooling liquid flat tubes, wherein each of the refrigerant flat tubes is externally sleeved with each of the cooling liquid flat tubes, and multiple cooling liquid flow channels are formed between an outer surface of the cooling liquid flat tube and an outer surface of the refrigerant flat tube; and a cooling liquid collection tube, disposed at two ends of the multiple (Continued)

groups of cooling liquid flat tubes and in communication with each of the cooling liquid flow channels, wherein the cooling liquid collection tube is separated from the refrigerant collection tube, so that a refrigerant circulates in the refrigerant flat tubes and the refrigerant collection tube, and cooling liquid flows in the cooling liquid flat tubes and the cooling liquid collection tube. The integrated radiator assembly is capable of meeting heating use requirements of a heat pump system without air supplement and enthalpy increase.

10 Claims, 2 Drawing Sheets

(58) Field of Classification Search
CPC ..... B60H 1/143; B60H 1/3213; F28D 9/0093; F28D 7/0066; F28D 1/04; F25B 2339/047; F25B 5/04; F25B 27/02; F25B 41/20; F25B 41/31; F25B 13/00; F25B 49/02
USPC .......................................................... 165/140
See application file for complete search history.

(56) References Cited

U.S. PATENT DOCUMENTS

| | | | | |
|---|---|---|---|---|
| 2,101,167 | A | * 12/1937 | De Baufre | F28D 7/0066 165/98 |
| 2,488,623 | A | * 11/1949 | Goeltz | F28F 9/0278 165/174 |
| 5,538,079 | A | 7/1996 | Pawlick | |
| 6,340,055 | B1 | 1/2002 | Yamauchi et al. | |
| 6,397,627 | B1 | * 6/2002 | Aki | F28F 9/0212 62/509 |
| 2003/0116308 | A1 | 6/2003 | Watanabe | |
| 2009/0229800 | A1 | 9/2009 | Bhatti et al. | |
| 2014/0318170 | A1 | * 10/2014 | Katoh | F28F 27/02 62/324.5 |

FOREIGN PATENT DOCUMENTS

| CN | 2473566 Y | 1/2002 |
|---|---|---|
| CN | 102483308 A | 5/2012 |
| CN | 102538307 A | 7/2012 |
| CN | 203824169 U | 9/2014 |
| CN | 104272055 A | 1/2015 |
| CN | 205014863 U | 2/2016 |
| CN | 110345668 A | 10/2019 |
| FR | 2868522 A1 | 10/2005 |
| GB | 1486805 A | 9/1977 |
| JP | 62-47888 | 3/1987 |
| JP | U1988154967 | 10/1988 |
| JP | 510694 | 1/1993 |
| JP | H08-261669 A | 10/1996 |
| JP | 2002-538411 | 11/2002 |
| JP | 2005-127684 A | 5/2005 |
| JP | 2013-137182 A | 7/2013 |
| KR | 10-2012-0003033 A | 1/2012 |
| KR | 10-2012-0108848 A | 10/2012 |

OTHER PUBLICATIONS $1^{st}$ Office Action for EP Application No. 19906735.6 dated Feb. 4, 2022 (4 pages).
$1^{st}$ Office Action for Japan Patent Application No. 2021-537215 (7 pages).
Notification of Grant for China Patent Application No. 201811649247.0 dated Jan. 20, 2021 (2 pages).
Decision on Reexamination for China Patent Application No. 201811649247.0 dated Sep. 4, 2020 (1 page).
Decision on Rejection for China Patent Application No. 201811649247.0 dated May 27, 2020 (4 pages).
$6^{th}$ Office Action for China Patent Application No. 201811649247.0 dated Nov. 24, 2020 (5 pages).
$5^{th}$ Office Action for China Patent Application No. 201811649247.0 dated Oct. 21, 2020 (5 pages).
$4^{th}$ Office Action for China Patent Application No. 201811649247.0 dated Sep. 4, 2020 (7 pages).
$3^{rd}$ Office Action for China Patent Application No. 201811649247.0 dated Apr. 14, 2020 (6 pages).
$2^{nd}$ Office Action for China Patent Application No. 201811649247.0 dated Mar. 20, 2020 (4 pages).
$1^{st}$ Office Action for China Patent Application No. 201811649247.0 dated Dec. 26, 2019 (5 pages).
Notice of Intent to Grant for EP Patent Application No. 19906735.6 dated Jan. 12, 2023 (19 pages).
$2^{nd}$ Office Action for EP Patent Application No. 19906735.6 dated Aug. 25, 2022 (3 pages).
$2^{nd}$ Office Action for Japan Patent Application No. 2021-537215 (5 pages).
International Search Report for PCT/CN2019/130150 (ISA/CN) dated Mar. 20, 2020 (7 pages).
Decision to Decline Amendment for Japan Patent Application No. 2021-537215 dated Sep. 26, 2023 (3 pages).
Decision of Refusal of Japan Patent Application No. 2021-537215 dated Sep. 26, 2023 (1 page).

* cited by examiner

INTEGRATED RADIATOR ASSEMBLY

CROSS-REFERENCE TO RELATED APPLICATIONS

The present application is a national phase entry of International Application No. PCT/CN2019/130150, filed Dec. 30, 2019, which is incorporated herein by reference in its entirety.

TECHNICAL FIELD

The present invention relates to the field of vehicles, and in particular, to an integrated radiator assembly.

BACKGROUND

A heat pump system of a vehicle can operate in two modes of refrigeration and heating, so a heat exchanger in the heat pump system is used as an evaporator during heating and as a condenser during refrigeration. Meanwhile, the vehicle is also provided with a radiator for cooling the temperature of the system, such as a radiating water tank of a traditional vehicle, a motor radiator of a new energy vehicle and the like.

In the prior art, the heat exchanger of the heat pump system and the radiator of a cooling system are usually disposed separately. Under a low temperature environment in winter, the existing heat pump system usually needs air supplement and enthalpy increase to meet the normal heating use requirement.

SUMMARY OF THE INVENTION

One objective of the present invention is to provide an integrated radiator assembly capable of meeting heating use requirements of a heat pump system without air supplement and enthalpy increase.

The other objective of the present invention is to effectively utilize heat of a motor and an electric control system to achieve energy conservation and consumption reduction.

Particularly, the present invention provides an integrated radiator assembly, including:
multiple groups of refrigerant flat tubes, wherein multiple refrigerant flow channels are disposed in each group of the refrigerant flat tubes;
a refrigerant collection tube, disposed at two ends of the multiple groups of refrigerant flat tubes and in communication with each of the refrigerant flow channels;
multiple groups of cooling liquid flat tubes, wherein each of the refrigerant flat tubes is externally sleeved with each of the cooling liquid flat tubes, and multiple cooling liquid flow channels are formed between an outer surface of the cooling liquid flat tube and an outer surface of the refrigerant flat tube; and
a cooling liquid collection tube, disposed at two ends of the multiple groups of cooling liquid flat tubes and in communication with each of the cooling liquid flow channels, wherein the cooling liquid collection tube is separated from the refrigerant collection tube, so that a refrigerant circulates in the refrigerant flat tubes and the refrigerant collection tube, and cooling liquid flows in the cooling liquid flat tubes and the cooling liquid collection tube.

Optionally, the integrated radiator assembly further includes:

an air fin, disposed between adjacent cooling liquid flat tubes.

Optionally, the refrigerant collection tube and the cooling liquid collection tube are integrated in a same side liquid collection tube.

Optionally, the side liquid collection tube is formed by stamping and then welding an aluminum plate.

Optionally, a separation layer is disposed inside the side liquid collection tube, and the separation layer separates the side liquid collection tube into a first cavity serving as the cooling liquid collection tube and a second cavity serving as the refrigerant collection tube.

Optionally, an end of the cooling liquid flat tube extends into the first cavity, so that cooling liquid in the cooling liquid flow channels is collected to the first cavity.

Optionally, an end of the refrigerant flat tube extends into the second cavity, so that a refrigerant in the refrigerant flow channels is collected to the second cavity.

Optionally, the refrigerant flat tubes extend in a first direction and are arranged in parallel in a second direction, and the first direction is perpendicular to the second direction.

Optionally, the refrigerant flow channels extend in the first direction and are sequentially arranged in parallel in a third direction, and the third direction is perpendicular to both the first direction and the second direction; and
the cooling liquid flow channels and the refrigerant flow channels are arranged in a same direction.

Optionally, both the refrigerant collection tube and the cooling liquid collection tube extend in the second direction.

According to the integrated radiator assembly of the present invention, a refrigerant flat tube of a common parallel flow heat exchanger is externally sleeved with a cooling liquid flat tube, and a refrigerant collection tube and a cooling liquid collection tube that are separated are provided for collecting a refrigerant and cooling liquid, respectively, which is equivalent to integrating a heat exchanger and a radiator into a whole. Such structure enables heat exchange between the refrigerant in the refrigerant flat tube and the cooling liquid in the cooling liquid flat tube. When refrigeration is needed, the refrigerant of the heat exchanger serving as an evaporator needs to absorb external heat, while the cooling liquid flowing outside the refrigerant flat tube carries a large amount of heat of a motor and an electric control system. At the moment, the refrigerant in the refrigerant flat tube can absorb the heat carried by the cooling liquid in the cooling liquid flat tube, and therefore the heating requirement thereof is met. Additional air supplement and enthalpy increase is not needed any more. Meanwhile, the heat of the motor and the electric control system is effectively utilized, which facilitates energy conservation and consumption reduction of a vehicle.

Further, the heat exchanger and the radiator are integrated into a whole, and independent machining and production and independent transportation and management are not needed any more, which can effectively reduce the cost. Moreover, the integrated radiator assembly can reduce the arrangement difficulty of a whole set of system and accelerate the production takt.

According to the following detailed descriptions of specific embodiments of the present invention in conjunction with the drawings, those skilled in the art will more clearly understand the above and other objectives, advantages and features of the present invention.

BRIEF DESCRIPTION OF THE DRAWINGS

Some specific embodiments of the present invention are described in detail below with reference to the drawings by way of example and not limitation. The same reference numerals in the drawings indicate the same or similar components or parts. Those skilled in the art should understand that these drawings are not necessarily drawn in scale. In the drawings.

DETAILED DESCRIPTION OF THE INVENTION

Figure 1:
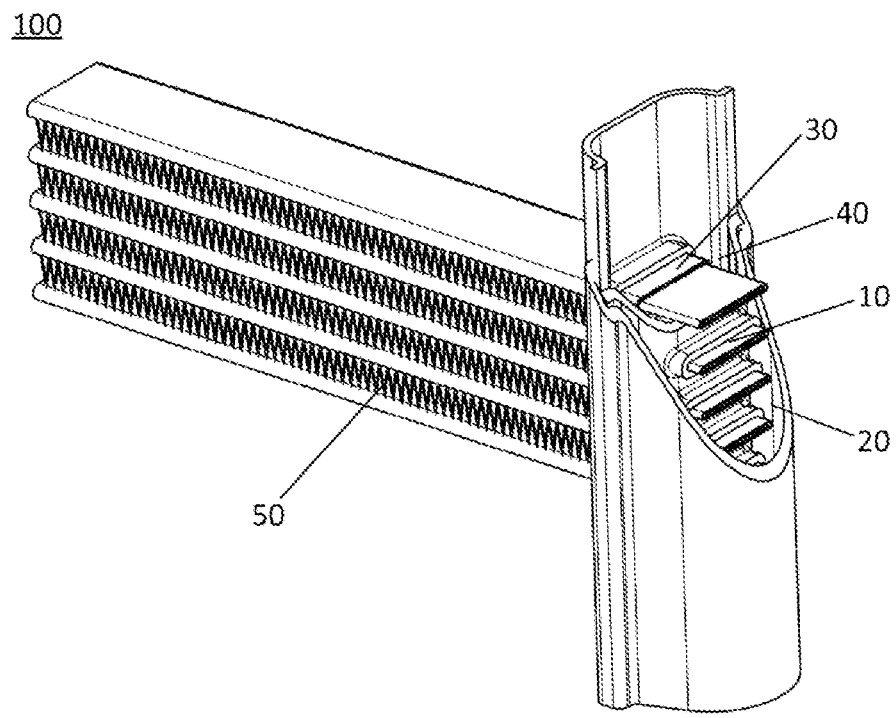
FIG. 1 is a schematic structural diagram of an integrated radiator assembly according to an embodiment of the present invention.
Figure 2:
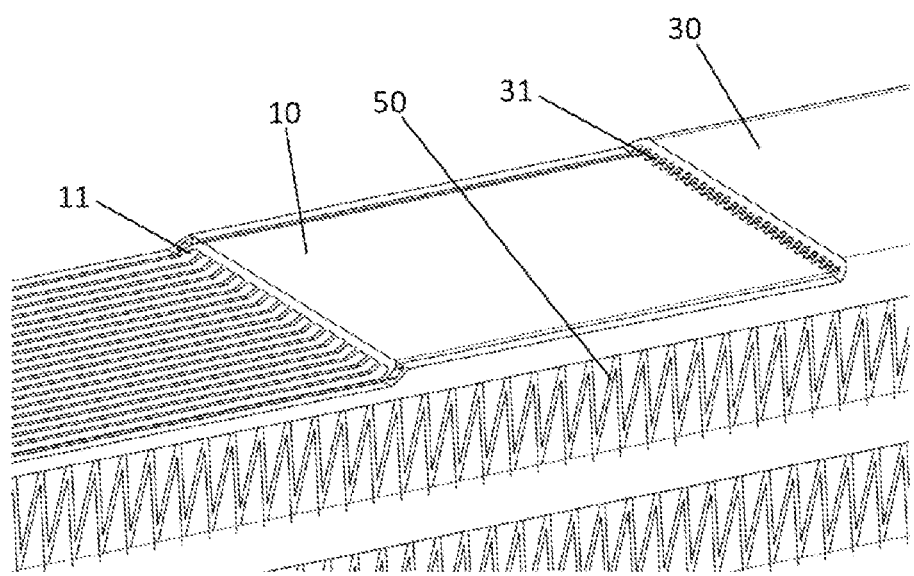
FIG. 2 is a schematic structural diagram of a refrigerant flat tube and a cooling liquid flat tube of an integrated radiator assembly according to an embodiment of the present invention.

FIG. 1 is a schematic structural diagram of an integrated radiator assembly according to an embodiment of the present invention. FIG. 2 is a schematic structural diagram of refrigerant flat tubes and cooling liquid flat tubes of an integrated radiator assembly according to an embodiment of the present invention. As shown in FIG. 1, the present embodiment provides an integrated radiator assembly 100, which may generally include multiple groups of refrigerant flat tubes 10, a refrigerant collection tube 20, multiple groups of cooling liquid flat tubes 30 and a cooling liquid collection tube 40. As shown in FIG. 2, multiple refrigerant flow channels 11 are disposed in each group of the refrigerant flat tubes 10. The refrigerant collection tube 20 is disposed at two ends of the multiple groups of refrigerant flat tubes 10 and in communication with each refrigerant flow channel 11. As shown in FIG. 2, each refrigerant flat tube 10 is externally sleeved with each cooling liquid flat tube 30, and multiple cooling liquid flow channels 31 are formed between an outer surface of the cooling liquid flat tube 30 and an outer surface of the refrigerant flat tube 10. The cooling liquid collection tube 40 is disposed at two ends of the multiple groups of cooling liquid flat tubes 30 and in communication with each cooling liquid flow channel 31. The cooling liquid collection tube 40 is separated from the refrigerant collection tube 20, so that a refrigerant circulates in the refrigerant flat tubes 10 and the refrigerant collection tube 20, and cooling liquid flows in the cooling liquid flat tubes 30 and the cooling liquid collection tube 40.

In fact, the multiple groups of refrigerant flat tubes 10 and the refrigerant collection tube 20 of the present embodiment are equivalent to a parallel flow heat exchanger in the prior art. According to the integrated radiator assembly 100 of the present embodiment, the refrigerant flat tube 10 of a common parallel flow heat exchanger is externally sleeved with the cooling liquid flat tube 30, and the refrigerant collection tube 20 and the cooling liquid collection tube 40 that are separated are provided for collecting the refrigerant and cooling liquid, respectively, which is equivalent to integrating a heat exchanger and a radiator into a whole. Such a structure enables heat exchange between the refrigerant in the refrigerant flat tube 10 and the cooling liquid in the cooling liquid flat tube 30. When refrigeration is needed, the refrigerant of the heat exchanger serving as an evaporator needs to absorb external heat, while the cooling liquid flowing outside the refrigerant flat tube 10 carries a large amount of heat of a motor and an electric control system. At the moment, the refrigerant in the refrigerant flat tube 10 can absorb the heat carried by the cooling liquid in the cooling liquid flat tube 30, and therefore the heating requirement thereof is met. Additional air supplement and enthalpy increase is not needed any more. Meanwhile, the heat of the motor and the electric control system is effectively utilized, which facilitates energy conservation and consumption reduction of a vehicle.

Further, the heat exchanger and the radiator are integrated into a whole, and independent machining and production and independent transportation and management are not needed any more, which can effectively reduce the cost. Moreover, the integrated radiator assembly 100 can reduce the arrangement difficulty of a whole set of system and accelerate the production takt.

In an embodiment, as shown in FIG. 1, the integrated radiator assembly 100 further comprises an air fin 50. The air fin 50 is disposed between adjacent cooling liquid flat tubes 30. The air fin 50 is beneficial to heat exchange of the integrated radiator assembly 100 and air.

When heating is needed in winter, the refrigerant in the refrigerant flat tube 10 absorbs heat in the cooling liquid and air in the vehicle, so that the heat of the whole vehicle is effectively utilized, and the heating requirement is met. When refrigeration is needed in summer, the refrigerant in the refrigerant flat tube 10 and the cooling liquid in the cooling liquid flat tube 30 dissipate heat to the outside through the air fin 50 to meet the radiating requirement. That is, the integrated radiator assembly 100 of the present embodiment realizes heat exchange among the refrigerant, the cooling liquid and the air, which not only can meet the radiating requirement during refrigeration, but also can meet the heat absorption requirement during heating, so that the heat of the whole vehicle is fully utilized.

Figure 3:
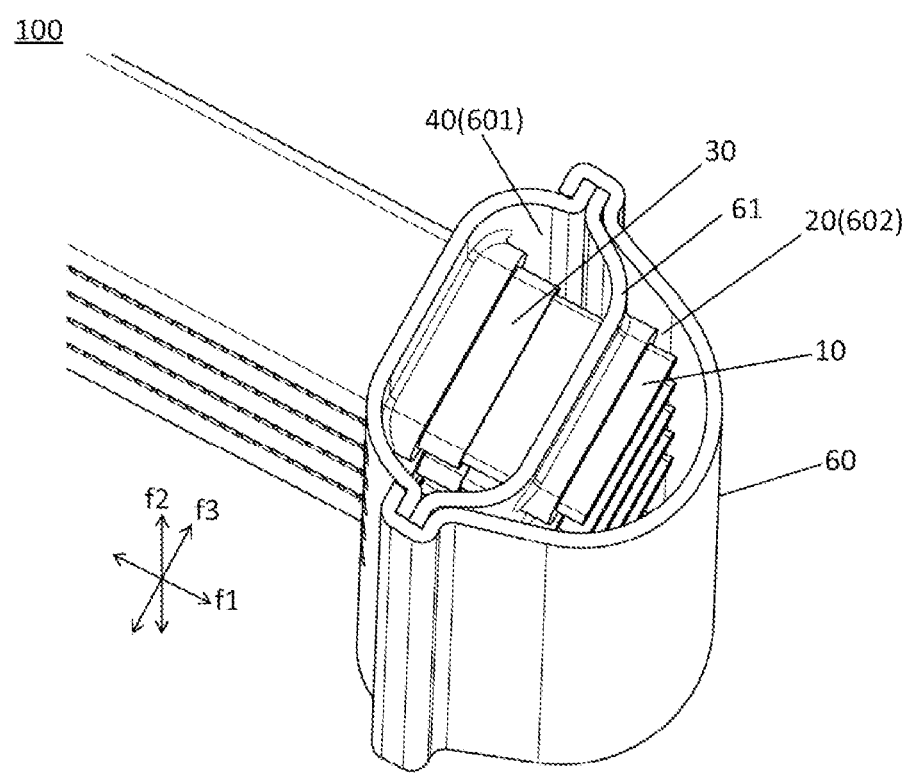
FIG. 3 is a schematic structural diagram of an integrated radiator assembly according to another embodiment of the present invention.

FIG. 3 is a schematic structural diagram of an integrated radiator assembly according to another embodiment of the present invention. As shown in FIG. 3, in an embodiment, the refrigerant collection tube 20 and the cooling liquid collection tube 40 are integrated in a same side liquid collection tube 60.

Optionally, the side liquid collection tube 60 is formed by stamping and then welding an aluminum plate.

In another embodiment, as shown in FIG. 3, a separation layer 61 is disposed inside the side liquid collection tube 60. The separation layer 61 separates the side liquid collection tube 60 into a first cavity 601 serving as the cooling liquid collection tube 40 and a second cavity 602 serving as the refrigerant collection tube 20.

As shown in FIG. 3, optionally, an end of the cooling liquid flat tube 30 extends into the first cavity 601, so that cooling liquid in the cooling liquid flow channels 31 is collected to the first cavity 601.

As shown in FIG. 3, optionally, an end of the refrigerant flat tube 10 extends into the second cavity 602, so that a refrigerant in the refrigerant flow channels 11 is collected to the second cavity 602.

In an embodiment, as shown in FIG. 3, the refrigerant flat tubes 10 extend in a first direction f1 and are arranged in parallel in a second direction f2. The first direction f1 is perpendicular to the second direction f2. Optionally, the first direction f1 is a horizontal direction, and the second direction f2 is a vertical direction.

The refrigerant flow channels 11 extend in the first direction f1 and are sequentially arranged in parallel in a third direction f3. The third direction f3 is perpendicular to both the first direction f1 and the second direction f2. The cooling liquid flow channels 31 and the refrigerant flow channels 11 are arranged in the same direction. Optionally, the third direction f3 is a direction on a horizontal plane perpendicular to the first direction f1.

Both the refrigerant collection tube 20 and the cooling liquid collection tube 40 extend in the second direction f2.

Hereto, those skilled in the art should realize that although multiple exemplary embodiments of the present invention have been shown and described in detail herein, without departing from the spirit and scope of the present invention, many other variations or modifications that conform to the principles of the present invention can still be directly determined or deduced from the contents disclosed in the present invention. Therefore, the scope of the present invention should be understood and deemed to cover all such other variations or modifications.

The invention claimed is:

1. An integrated radiator assembly, comprising:
    multiple groups of refrigerant flat tubes, wherein multiple refrigerant flow channels are disposed in each group of the refrigerant flat tubes;
    a refrigerant collection tube, disposed at two ends of the multiple groups of refrigerant flat tubes and in communication with each of the refrigerant flow channels;
    multiple groups of cooling liquid flat tubes, wherein each of the refrigerant flat tubes is externally sleeved with each of the cooling liquid flat tubes, and multiple cooling liquid flow channels are formed between an outer surface of the cooling liquid flat tube and an outer surface of the refrigerant flat tube; and
    a cooling liquid collection tube, disposed at two ends of the multiple groups of cooling liquid flat tubes and in communication with each of the cooling liquid flow channels, wherein the cooling liquid collection tube is separated from the refrigerant collection tube, so that a refrigerant circulates in the refrigerant flat tubes and the refrigerant collection tube, and cooling liquid flows in the cooling liquid flat tubes and the cooling liquid collection tube.

2. The integrated radiator assembly according to claim 1, further comprising:
    an air final disposed between adjacent cooling liquid flat tubes.

3. The integrated radiator assembly according to claim 2, wherein
    the refrigerant collection tube and the cooling liquid collection tube are integrated in a same side liquid collection tube.

4. The integrated radiator assembly according to claim 3, wherein
    the side liquid collection tube is formed by stamping and then welding an aluminum plate.

5. The integrated radiator assembly according to claim 3, wherein
    a separation layer is disposed inside the side liquid collection tube, and the separation layer separates the side liquid collection tube into a first cavity serving as the cooling liquid collection tube and a second cavity serving as the refrigerant collection tube.

6. The integrated radiator assembly according to claim 5, wherein
    an end of the cooling liquid flat tube extends into the first cavity, so that cooling liquid in the cooling liquid flow channels is collected to the first cavity.

7. The integrated radiator assembly according to claim 5, wherein
    an end of the refrigerant flat tube extends into the second cavity, so that a refrigerant in the refrigerant flow channels is collected to the second cavity.

8. The integrated radiator assembly according to claim 7, wherein
    the refrigerant flat tubes extend in a first direction and are arranged in parallel in a second direction, and the first direction is perpendicular to the second direction.

9. The integrated radiator assembly according to claim 8, wherein
    the refrigerant flow channels extend in the first direction and are sequentially arranged in parallel in a third direction, and the third direction is perpendicular to both the first direction and the second direction; and
    the cooling liquid flow channels and the refrigerant flow channels are arranged in a same direction.

10. The integrated radiator assembly according to claim 9, wherein
    both the refrigerant collection tube and the cooling liquid collection tube extend in the second direction.

* * * * *